June 15, 1943.  J. C. WOODFORD ET AL  2,321,785
FLUID METER
Filed June 23, 1941  3 Sheets-Sheet 3
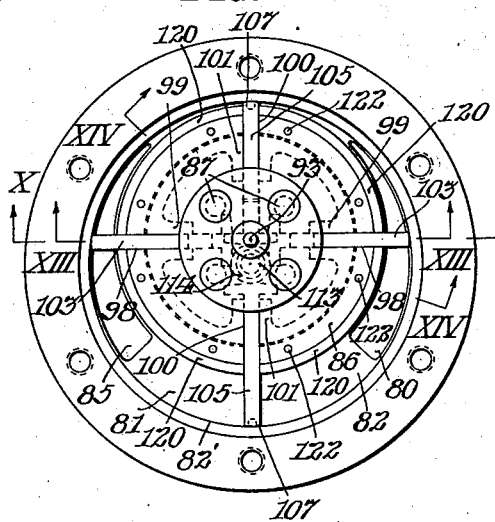
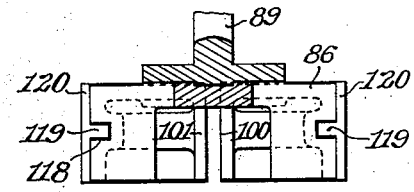
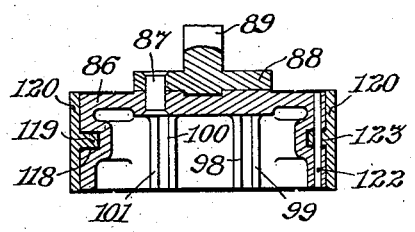
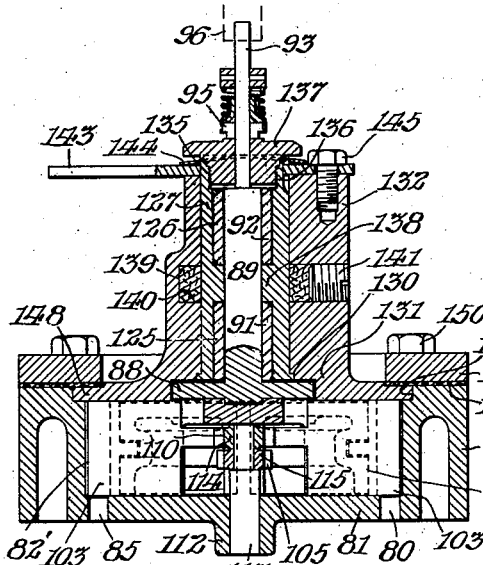
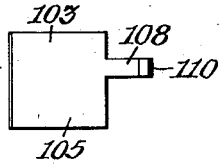
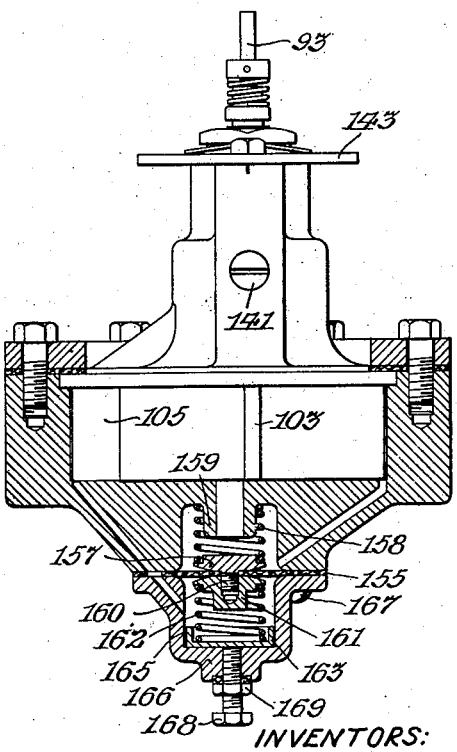
INVENTORS:
JOSEPH C. WOODFORD,
ANTHONY G. MUSKUS,
BY Frank E. Paige
Attorney.

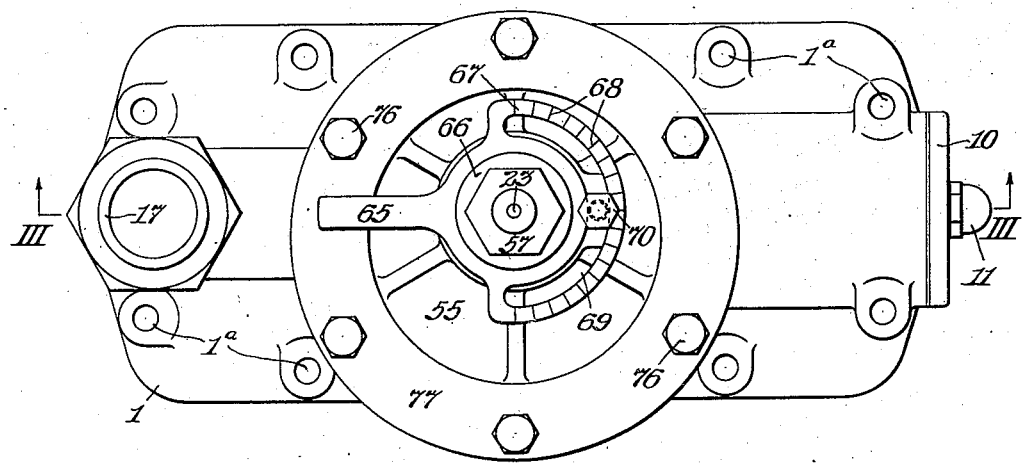
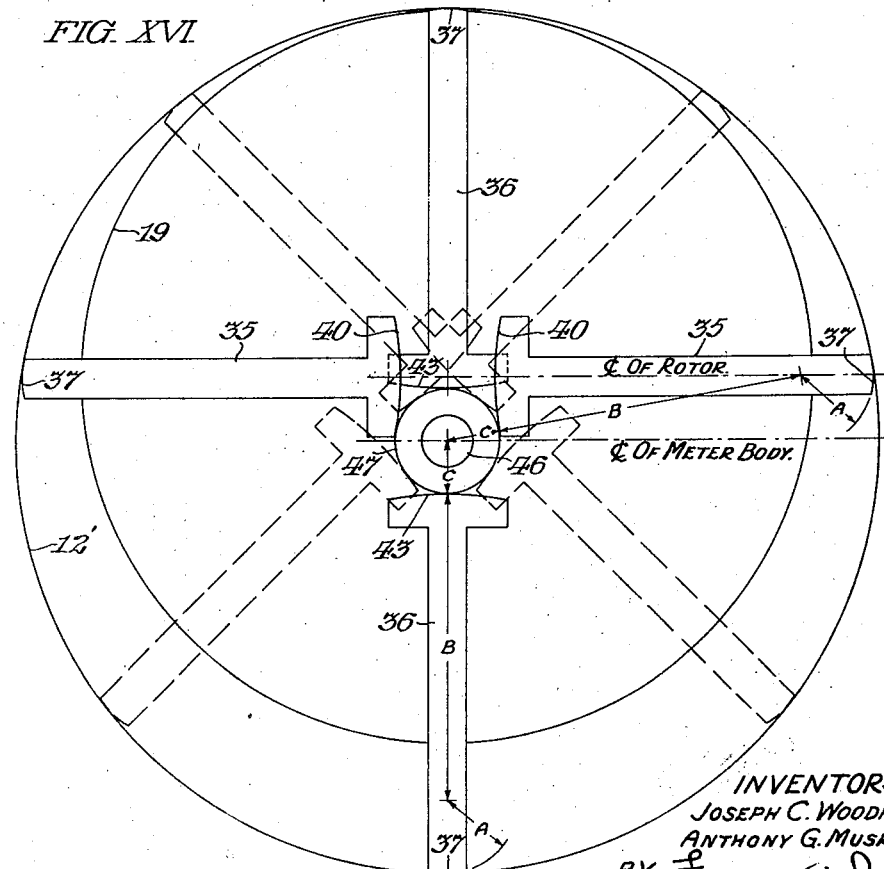

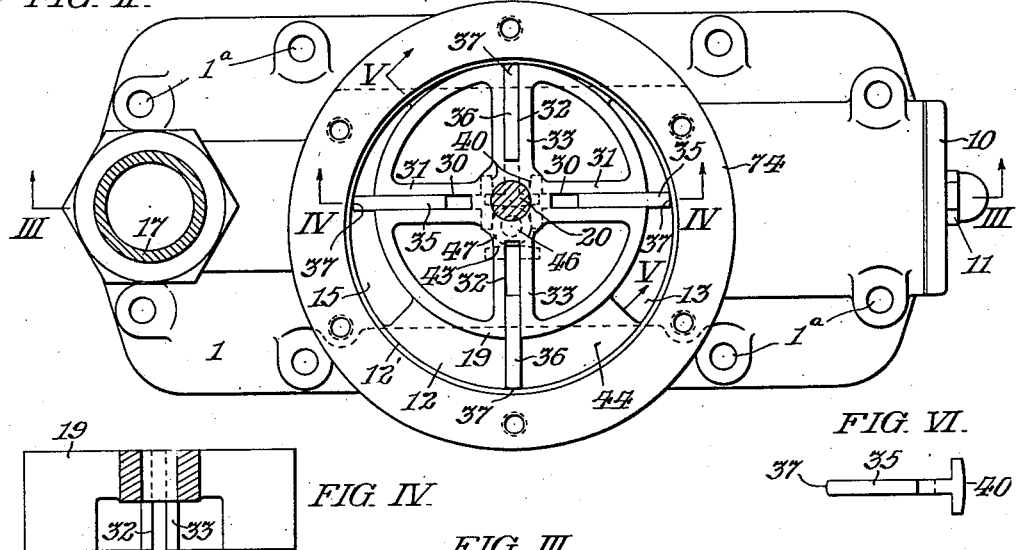
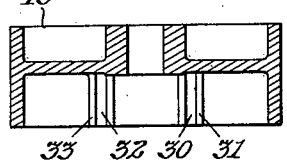
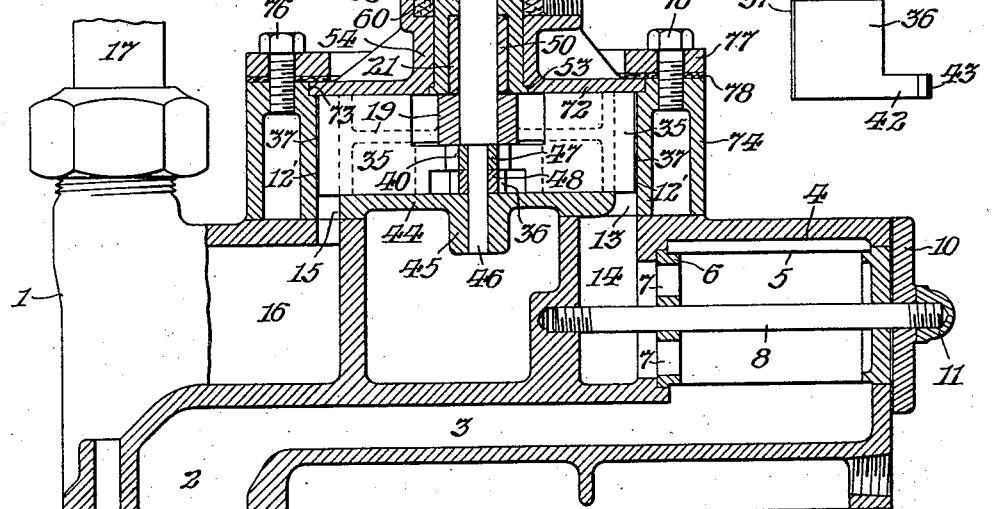

Patented June 15, 1943

2,321,785

UNITED STATES PATENT OFFICE 2,321,785

FLUID METER

Joseph C. Woodford, Spring Lake, Mich., and Anthony G. Muskus, Conshohocken, Pa., assignors to John Wood Manufacturing Company, Inc., Philadelphia, Pa., a corporation of Delaware Application June 23, 1941, Serial No. 399,276

4 Claims. (Cl. 73—261)

Our invention relates to fluid meters which include a rotor provided with a plurality of sliding blades for contact with the wall of the meter casing, or stator.

One feature of our invention is the provision in the rotor of sliding blades constructed in accordance with a system of radii which insures definite correct control of blade position with respect to the inner wall of the stator at all times throughout the range of adjustment of the rotor, to predeterminedly vary the metering capacity for each rotation of the rotor.

Another feature of our invention is that in meters made in accordance therewith it is possible to secure a very accurate selective fitting of the rotor blades when machined in mass production or quantities by matching up the blades in sets and using rollers of varying diameter sizes to compensate for slight variations in the overall lengths of the blades and for slight variations in the diameters of the stator chamber walls of the meters being assembled.

Still another feature of our invention is the provision of rotatable means, on the axis of the stator, for continuous engagement with the arcuate inner end surfaces of the rotor blades for maintaining the outer ends of said rotor blades in correct continuous contact with the stator wall.

Still another feature of our invention is that any rotor blade wear, due to lengthy operation of the meter, can be compensated for by merely increasing the diameter of the rotatable means, carried on the axis of the stator, and such increasing of the diameter of the rotatable means does not seriously affect the geometry of the formation of the blades.

Still another feature of our invention is the provision of sealing sectors on the rotor and by which extremely close clearances may be maintained between the upper and lower surfaces of the sectors respectively with the top and bottom of the meter body without requiring that the main body of the rotor be closely fitted and accurately located by means of its bearings.

Still another feature of our invention is that meters made in accordance therewith allow a minimum of leakage, and also such meters can be operated by fluid under low pressures.

Still another feature of our invention is the provision of novel means for reducing any vibration of the meter.

Still another feature of our invention is the provision of novel means connected to the inlet and outlet sides of the meter for compensating for either compression or vacuum, thus preventing any development of extreme compression or chattering.

Our invention includes the various novel features of construction and arrangement hereinafter more definitely specified.

Fig. I is a plan view of a meter embodying our invention.

Fig. II is a partly sectional plan view of the meter shown in Fig. I, but with the removable cover plate and clamp ring removed.

Fig. III is a vertical sectional view, but with the outlet connections shown in elevation, of the meter shown in Fig. I, taken generally on the lines III, III, in Figs. I and II.

Fig. IV is a vertical section of the rotor shown in Figs. II and III, taken on the lines IV, IV, in Fig. II.

Fig. V is a vertical section of the rotor shown in Fig. II, taken on the lines V, V, in Fig. II.

Fig. VI is a plan view of one of the rotor blades.

Fig. VII is a side elevation of one of the first series of rotor blades.

Fig. VIII is a side elevation of one of the second series of rotor blades.

Fig. IX is a fragmentary plan view, similar to Fig. II, showing a modified form of our invention.

Fig. X is a vertical sectional view taken generally on the lines X, X, in Fig. IX.

Fig. XI is a plan view of one of the series of blades shown in Fig. X.

Fig. XII is a side elevation of one of the series of blades shown in Fig. X.

Fig. XIII is a fragmentary vertical sectional view of the rotor assembly shown in Fig. IX, taken on the lines XIII, XIII, in Fig. IX.

Fig. XIV is a fragmentary vertical sectional view of the rotor assembly shown in Fig. IX, taken on the lines XIV, XIV, in Fig. IX.

Fig. XV is a partly sectional side elevation of a modification of the forms of our invention shown in Figs. III and X.

Fig. XVI is a somewhat schematic plan view showing the system of radii on which the rotor blades shown in Figs. VI, VII, VIII, XI, and XII are formed.

Referring to the form of our invention shown in Figs. I to VIII inclusive, I indicates the meter body which, for convenience, is provided with a series of openings 1ª therethrough for a series of bolts for effecting mounting of the meter. Said meter body I has the fluid inlet port 2 and inlet passageway 3 leading to the screen chamber 4. Said screen chamber 4 includes the screen 5 carried by the screen frame 6 which is provided with a series of openings 7. Said screen is held in position by means of the bolt 8 which is in screw threaded relation with one of the inner walls of the meter body 1. Said screen chamber 4 is provided with the closure cap 10 held in fluid-tight position against the meter body 1 by means of the nut 11 engaging the outer screw threaded end of the bolt 8.

Said meter body 1 includes the meter chamber 12 having the elongated inlet port 13 located in the bottom wall thereof and connected to the fluid inlet 3 and chamber 4 by means of the passageway 14. Said meter chamber 12 is provided with the elongated outlet port 15 which is connected to the discharge port 16. Said discharge port 16 is connected to the discharge tube 17 through which fluid is delivered from the meter.

Said meter body 1 encloses the rotor 19 which is rigidly attached to the rotor shaft 20 journaled in the frictionless bearings 21 and 22. Said rotor shaft 20 has at the upper end thereof the reduced portion 23 which extends through a liquid seal, or rotary seal, 25, which liquid seal may be of any well-known construction. Said reduced diameter portion 23 of the rotor shaft 20 is provided at its upper end with the coupling member 27. Said coupling member 27 affords a convenient means for connecting said meter with the drive shaft of a counter of any of the well-known constructions which is adaptable for recording the volume of fluid passed through a meter.

Said rotor 19 has the pair of diametrically opposite radial slots 30 formed in the guide spokes 31 of said rotor 19, and the diametrical slots 32 formed in the guide spokes 33. Each of the pair of said slots 30 contains a rotor blade 35 which is closely fitted for sliding contact in its respective radial slot 30. Each of the pair of said slots 32 contains a rotor blade 36 which is closely fitted for sliding contact in its respective radial slot 32.

As shown in Fig. XVI, the outer ends 37 of both the series of blades 35 and 36 are arcuately formed from the radius A so as to provide continuous contact with the surface of the wall 12' of the meter chamber 12, regardless of the position of the axis of the rotor with respect to the axis of the meter chamber, or stator 12.

As shown in Figs. III and VII, the blades 35 are provided at their inner ends with a stepped reduced portion 39 which has an arcuate bearing surface 40 formed from the radius B, as best shown in Fig. XVI. As shown in Figs. III and VIII, the blades 36 have at their bottom inner ends a reduced portion 42 having the arcuate bearing surface 43, formed from a radius B, identical in dimension with that from which the arcuate surface 40 is formed, as best shown in Fig. XVI.

As shown in Fig. III, the transverse web 44, of the meter body 1, which forms the bottom closure of the meter chamber 12, is provided with the boss 45, in coaxial relation with the axis of the meter chamber 12. Said boss has rigidly mounted therein the stud 46 on which is mounted the superimposed rollers 47 and 48 which engage respectively the arcuate surfaces 40 of the series of blades 35, and the arcuate surfaces 43 of the series of blades 36.

Thus, the series of sliding blades 35 and 36 do not depend only on centrifugal force to cause them to follow the periphery of the wall 12' of the meter chamber 12, but said series of blades 35 and 36 are controlled positively within close dimensions by means of the rollers 47 and 48 respectively engaging the arcuate surfaces 40 and 43 formed at the inner ends of the series of blades 35 and 36.

The arcuate surfaces 40 and 43 of the blades 35 and 36, formed from a radius B, are of such design that when the blades 35 and 36 are rotated with the rotor 19, the outer arcuate surfaces 37 describe a circle about the center of the meter body 1, or concentric with the diameter of the stator chamber 12, with the result that practically a liquid seal is maintained between the outer blade tips 37 and the chamber wall 12'.

The frictionless bearings 21 and 22 are forced by pressure into the respective cylindrical openings 50 and 51 of the eccentric adjusting sleeve 52 which has at its lower end the enlarged flanged portion 53 journaled in the bearing 54 of the cover plate 55. The opening 51 is provided at its upper end with the internal screw thread 56 for engagement with the external screw thread of the screw plug 57. Said eccentric sleeve is provided with the interior reduced portion 58 between the cylindrical openings 50 and 51.

The cover plate 55 has the annular groove 60 which is provided with the packing 61, which packing is in engagement with the outer surface of the eccentric sleeve 52 and thus prevents leakage of any fluid from the meter chamber 12 to the outside top of the cover plate 55. We find it convenient to also provide said cover plate 55 with the packing screw 62 for engagement with the packing 61, so that said packing 61 may be maintained in fluid-tight relationship to said eccentric sleeve 52.

Said eccentric adjustment sleeve 52 is slidably keyed to the adjustment lever 65, and said sleeve 52 is urged upwardly by the cup spring 66 interposed between the adjustment lever 65 and the flange of the screw plug 57.

Said adjustment lever 65 includes the enlarged semi-circular portion 67, having a series of indicia 68, and provided with the arcuate slot 69 through which the clamping screw 70 extends into screw threaded engagement with the top of the cover plate 55.

Calibration of the meter is effected by rotation of the adjustment lever 65, after loosening the clamping screw 70, which rotation of the lever 65 causes corresponding rotation of the eccentric adjustment sleeve 52 and shifts the rotor shaft 20 and rotor 19 so as to change the eccentricity of the rotor with respect to the stator, or meter chamber 12.

The rotor 19 is of such diameter and so positioned in the meter chamber 12 that at any setting of the adjustment lever 65 there is always clearance between the periphery of the rotor 19 and the inner wall 12' of the meter chamber. Such clearance results in a small amount of fluid being carried back through the meter from the discharge side to the inlet side, with the result that the total fluid passing through the meter per revolution of the rotor is equal to the large volume of fluid passing through the passageway 14 minus the small amount of fluid which is returned from the outlet to the inlet side of the meter, as described above.

We find it convenient to provide the cover plate 55 with the enlarged circular flange 72 which fits snugly into the annular recess 73 formed at the top edge of the annular portion 74, of the meter body 1, which annular portion 74 forms the side wall of the meter chamber 12.

Said cover plate 55 is maintained in fluid-tight relation with said annular portion 74 by means of the series of screws 76 extending through the clamping ring 77 and gasket 78 into tapped openings in the upper surface of said annular side wall 74.

The form of our invention shown in Figs. IX to XIV inclusive is a modification of the form of our invention shown in Figs. I to VIII inclusive, and permits of the maintenance of very close clearance between the edges of sectors carried by the rotor and the top and bottom of the meter body, and eliminates the necessity of closely fitting and accurately locating the rotor proper by means of its bearings.

Referring to said Figs. IX to XIV inclusive; for convenience we have shown of the complete meter body only the cylindrical portion thereof in which the rotor is contained. It is to be understood, however, that the outward configuration of the complete meter body is the same as that shown in Fig. I and includes a fluid inlet port and inlet passageway opening into a screen chamber which is in communication with the elongated inlet port 80 located in the bottom wall 81 of the meter chamber 82 of the meter body 83. Said meter chamber 82 is provided with the elongated outlet port 85 which is connected to a discharge port in communication with a discharge pipe through which fluid is delivered from the meter.

Said meter body 83 encloses the rotor 86 which is conveniently connected by a series of rivets 87 to the flanged end 88 of the rotor shaft 89, which rotor shaft 89 is journaled in the frictionless bearings 91 and 92. Said shaft 89 has at the upper end thereof the reduced portion 93 which extends through a liquid seal, or rotary seal 95, which liquid seal may be of any well known construction. Said reduced diameter portion 93 of the rotor shaft 89 is conveniently provided at its upper end with the coupling member 96. Said coupling member 96 affords a convenient means for connecting said meter with a counter of any of the well-known types which is adaptable for recording the volume of fluid passed through a meter.

Said rotor 86 has the pair of diametrically opposite radial slots 98 formed in the projections 99 of said rotor 86, and the radial slots 100 formed in the projections 101. Each of the pair of said slots 98 contains a rotor blade 103 which is closely fitted for sliding contact in its respective radial slot 98. Each of the pair of said slots 100 contains a rotor blade 105 which is closely fitted for sliding contact in its respective radial slot 100.

The outer ends 107 of the series of blades 103 and 105 are arcuately formed from a radius A, as is indicated in Fig. XVI, so as to provide continuous contact with the surface wall 82' of the meter chamber 82, regardless of the position of the axis of the rotor with respect to the axis of the meter chamber, or stator 82.

As shown in Figs. XI and XII, the blades 103 and 105 are provided at their inner ends with the reduced portion 108 which has an arcuate bearing surface 110 formed from a radius B, as indicated in Fig. XVI.

As shown in Figs. X, XI, and XII, the blades 103 and 105 are identical in configuration, and the series of blades 105 are merely inserted in the rotor 86 in upside-down position with respect to the position of the blades 103. Such construction is made possible because of the connecting of the rotor 86 to its shaft 89 by means of the flange 88, which permits the rollers 114 and 115 to be located approximately at the middle of the rotor chamber so as to more nearly centralize the roller thrust on both series of blades 103 and 105, and thus prevent said blades from canting against the upper or lower surfaces of the meter body.

As shown in Fig. X, the bottom wall 81 of the meter chamber 82 is provided with the boss 112 in coaxial relation with the axis of the meter chamber 82. Said boss 112 has rigidly mounted therein the stud 113 on which is mounted the superimposed rollers 114 and 115 which engage respectively the arcuate surfaces 110 of the series of blades 103 and 105.

Thus, as heretofore described with reference to the form of our invention shown in Figs. I to VIII inclusive, the series of sliding blades 103 and 105 shown in Figs. IX to XIV inclusive do not depend only on centrifugal force to cause them to follow the periphery of the wall 82' of the meter chamber 82, but said series of blades 103 and 105 are controlled positively within close dimensions by means of the rollers 114 and 115 respectively engaging the arcuate surfaces 110 formed at the inner ends of the series of blades 103 and 105. The arcuate surfaces 110, formed from a radius B, as indicated in Fig. XVI, are of such design that when the blades 103 and 105 are rotated with the rotor 86, the outer arcuate surfaces 107 describe a circle about the center of the meter body 83, or concentric with the diameter of the stator chamber 82, thus resulting in the maintenance of practically a liquid seal between the outer blade tips 107 and the chamber wall 82'.

As shown in Figs. IX, X, XIII, and XIV, said rotor 86 is provided with an annular groove 118 adapted to receive the sectoral flanges, or tongues, 119 formed on the four sectors 120. Said sectors 120 are connected to the rotor 86 by means of the pins 122 which are tightly fitted in the rotor 86. As best shown in Figs. XIII and XIV, the sectoral flanges 119 are slightly narrower than the annular groove 118, and the holes 123 through the sectoral flanges 119 are of sufficiently larger diameter than the diameter of the pins 122 so as to permit the flanges 119 to slide on the pins 122. Such limited freedom of movement enables the sectors 120 to adjust themselves intermediate of the top and bottom meter body walls and at the same time always be maintained concentric with the rotor 86.

The frictionless bearings 91 and 92 are forced by pressure into respective cylindrical openings 125 and 126 of the eccentric adjusting sleeve 127, which sleeve has at its lower end the enlarged flanged portion 130 journaled in the bearing 131 of the cover plate 132. The opening 126 is provided at its upper end with the internal screw thread 135 for engagement with the external screw thread 136 of the screw plug 137. Said eccentric sleeve 127 is provided with the interior reduced portion 138 between the cylindrical openings 125 and 126.

The cover plate 132 has the annular groove 139 which is provided with the packing 140, which packing is in engagement with the outer surface of the eccentric sleeve 127 and thus prevents leakage of any fluid from the meter chamber 82 to the outside top of the cover plate 132. We find it convenient to also provide said cover plate 132 with the packing screw 141 for engagement with the packing 140 so that said packing may be maintained in fluid-tight relationship to said eccentric sleeve 127.

Said eccentric adjustment sleeve 127 is slidably keyed to the adjustment lever 143, similar in construction to the lever 65 shown in Fig. I, and said sleeve 127 is urged upwardly by the cup spring 144 interposed between the adjustment lever 143 and the flange of the screw plug 137. In the same manner as is the adjustment lever 65 of the form of our invention shown in Figs. I to VIII inclusive, said adjustment lever 143 is correspondingly provided with an enlarged semi-cylindrical portion carrying a series of indicia and provided with an arcuate slot through which the clamping screw 145 extends into screw threaded engagement with the top of the cover plate 132. Calibration of the meter in the form shown in Figs. IX to XIV inclusive, is effected by rotation of the adjustment lever 143 in exactly the same manner as heretofore described with reference to the form of our invention shown in Figs. I to VIII.

The diameter of the rotor 86 including the four sectors 120, and its position in the meter chamber 82, is such that at any setting of the adjustment lever 143 there is always clearance between the periphery of any of the rotor sectors 120 and the inner wall 82' of the meter chamber. Such clearance, correspondingly, results in a small amount of fluid being carried back through the meter from the discharge side to the inlet side, with the result that the total fluid passing through the meter per revolution of the sector-carrying rotor is equal to the large volume of fluid passing through the passageway 80 minus the small amount of fluid which is returned from the outlet to the inlet side of the meter, as described above.

We find it convenient to provide the cover plate 132 with the enlarged circular flange 148 which fits snugly into the annular recess 149 formed at the top edge of the annular side wall of the meter body 83. Said cover plate 132 is maintained in fluid-tight relation with the meter body 83 by means of a series of screws 150 extending through the clamping ring 151 and gasket 152 into tapped openings in the upper surface of the annular side wall of the meter body 83.

We have shown in Fig. XV a modification which may be applied to either of the hereinabove described forms of our invention. Said modification consists of the spring-bound diaphragm 155, one side of which is ported to the side of the meter chamber in which is located the inlet port and the other side of which is ported to the side of the chamber including the outlet port. Said diaphragm 155 carries at its upper side the flanged stud 157 carrying the spring 158, the distal end of which encircles the boss 159, similar to either the boss 45 or the boss 112 formed on the bottom closure of the meter body. Said flanged stud 157 is provided with the screw-threaded reduced portion 160 which engages a screw-threaded opening in the stud 161 positioned on the underside of the diaphragm 155. Said stud 161 carries the spring 162, the opposite end of which is supported by the cup member 163 located in the bottom of the cylindrical opening 165 formed in the cap closure 166 which is conveniently connected in fluid-tight relation by a series of screws 167, one of which is shown in Fig. XV, with the meter body proper. Said cap closure 166 carries the adjusting screw 168, provided with the lock nut 169, and movement of the adjusting screw 168 predetermines the tension of the springs.

As there is a tendency for either compression or vacuum in these chambers, as the rotor blades pass the end of the ports, and as the tendency toward vacuum in one chamber occurs simultaneously with the tendency for compression in the other chamber, the diaphragm 155 will tend to shift its position against spring tension and prevent extreme compression and chattering development.

Also depending on the adjustment of the springs 158 and 162, by means of the adjusting screw 168, the motion of the diaphragm 155 will affect displacement of the meter in relation to differential pressure across the meter. For example, at low rates of flow, the pressure differential across the meter will be low and the diaphragm will be only slightly deflected and, therefore, will not increase appreciably the meter capacity. Under such a condition, more time is required to deliver a certain quantity of fluid, and the normal slight leakage through the meter will tend to increase the meter capacity. However, when a high rate of flow is required, the pressure differential across the meter increases materially, and the diaphragm 155 is subjected to more deflection so as to add to the capacity of the meter, while the normal leakage becomes much less effective, even with the higher differential pressure, due to the great reduction in the length of time required to deliver a given quantity of fluid.

Therefore, we have discovered that the inclusion of a spring-bound diaphragm not only reduces vibration, but also may be used as an adjustable compensating element even to a degree necessary to provide sufficient adjustment, within limits, as would permit of the elimination of eccentric adjustment sleeves such as the sleeve 52 or the sleeve 127.

We do not desire to limit ourselves to the precise details of construction and arrangement above described, as it is obvious that various modifications may be made therein without departing from the essential features of our invention, as defined in the appended claims.

We claim:

1. In a fluid meter including a stator having a cylindrical chamber and a rotor mounted on an axis eccentric to the axis of the stator chamber and carrying a plurality of blades adapted for reciprocatory movement therein; the combination with arcuate surfaces at the outer ends of said blades; of arcuate surfaces at the inner ends of said blades; and rotatable means mounted on the axis of the stator chamber for continuous engagement with said arcuate surfaces at the inner ends of said blades; whereby the arcuate outer ends of said blades are caused positively to describe a circle concentric with the axis of the stator chamber and following the periphery thereof, thereby maintaining practically a liquid seal between the outer tips of the rotor blades and the periphery of the stator chamber wall; wherein the rotor is provided with a circumferential series of sectors of greater axial dimension than said rotor, said sectors having freedom of axial movement with respect to said rotor.

2. In a fluid meter including a stator having a cylindrical chamber and a rotor mounted on an axis eccentric to the axis of the stator chamber and carrying a plurality of blades adapted for reciprocatory movement therein; the combination with arcuate surfaces at the outer ends of said blades; of arcuate surfaces at the inner ends of said blades; and rotatable means mounted on the axis of the stator chamber for continuous engagement with said arcuate surfaces at the inner ends of said blades; whereby the arcuate outer ends of said blades are caused positively to describe a circle concentric with the axis of the stator chamber and following the periphery thereof, thereby maintaining practically a liquid seal between the outer tips of the rotor blades and the periphery of the stator chamber wall; including an annular groove in the periphery of said rotor; a circumferential series of sectors positioned on the periphery of said rotor; tongues formed on said sectors for engagement in said rotor groove, said tongues being of lesser dimensions than said groove; and means connecting said sectors to said rotor and permitting freedom of axial movement of said sectors.

3. In a fluid meter including a stator, having a cylindrical chamber provided with an inlet port and an outlet port, and a cylindrical rotor mounted on an axis eccentric to the axis of the stator chamber and carrying a plurality of blades adapted for reciprocatory movement therein; the combination with arcuate surfaces at the outer ends of said blades; of arcuate surfaces at the inner ends of said blades; rotatable means mounted on the axis of the stator chamber for continuous engagement with said arcuate surfaces at the inner ends of said blades; a diaphragm chamber; an imperforate spring loaded diaphragm balanced between spring loading elements in said diaphragm chamber, dividing said diaphragm chamber into two chambers on opposite sides of said diaphragm; means connecting the chamber on one side of said diaphragm to the chamber at the inlet side of the meter; and means connecting the chamber on the opposite side of said diaphragm to the chamber at the outlet side of the meter.

4. A structure as in claim 3; including adjustable means to vary the spring loading of said diaphragm.

JOSEPH C. WOODFORD.
ANTHONY G. MUSKUS.